United States Patent
Nagatoshi

(10) Patent No.: US 11,112,587 B2
(45) Date of Patent: *Sep. 7, 2021

(54) IMAGING OPTICAL SYSTEM, PROJECTION-TYPE DISPLAY APPARATUS, AND IMAGING APPARATUS

(71) Applicant: FUJIFILM Corporation, Tokyo (JP)

(72) Inventor: Yukiko Nagatoshi, Saitama (JP)

(73) Assignee: FUJIFILM Corporation, Tokyo (JP)

(*) Notice: Subject to any disclaimer, the term of this patent is extended or adjusted under 35 U.S.C. 154(b) by 117 days.

This patent is subject to a terminal disclaimer.

(21) Appl. No.: 16/555,109

(22) Filed: Aug. 29, 2019

(65) Prior Publication Data
US 2020/0012082 A1 Jan. 9, 2020

Related U.S. Application Data

(62) Division of application No. 15/602,527, filed on May 23, 2017, now Pat. No. 10,437,027.

(30) Foreign Application Priority Data

May 25, 2016 (JP) .................................. 2016-104120

(51) Int. Cl.
*G02B 13/00* (2006.01)
*G02B 9/00* (2006.01)
(Continued)

(52) U.S. Cl.
CPC .............. *G02B 13/04* (2013.01); *G02B 13/16* (2013.01); *G02B 27/0025* (2013.01); *G03B 21/14* (2013.01)

(58) Field of Classification Search
CPC .... G02B 13/0045; G02B 13/04; G02B 13/12; G02B 13/16; G02B 13/22; G02B 27/0025; G03B 21/14
(Continued)

(56) References Cited

U.S. PATENT DOCUMENTS 7,224,535 B2 5/2007 Neil
10,437,027 B2 * 10/2019 Nagatoshi .............. G02B 13/04
(Continued)

FOREIGN PATENT DOCUMENTS

JP   2005-128286 A   5/2005
JP   2011-033738 A   2/2011
(Continued)

OTHER PUBLICATIONS

An Office Action mailed by the Japanese Patent Office dated May 28, 2019, which corresponds to Japanese Patent Application No. 2016-104120 and is related to U.S. Appl. No. 15/602,527.

*Primary Examiner* — Thong Q Nguyen
(74) *Attorney, Agent, or Firm* — Studebaker & Brackett PC

(57) ABSTRACT

The imaging optical system consists of first and second optical systems in order from a magnified side. The second optical system forms an image on an image display surface as an intermediate image. The first optical system forms the intermediate image on a magnified-side conjugate plane. A height H of a principal ray of light having a maximum angle of view becomes maximum on a lens surface of the whole system (having focal length f) on the most magnified side, among heights of principal rays of light having a maximum angle of view on respective lens surfaces, satisfying predetermined Conditional Expressions (1) and (2):

$$0.03 < H \times |f| / (L \times I) < 0.09 \qquad (1)$$

$$0.35 < I/dl \qquad (2)$$

Where L is an optical axis distance between lens surfaces on the most magnified and reduced sides, I is a reduced side maximum image height, and dl is a maximum air spacing on the optical axis within the system.

14 Claims, 12 Drawing Sheets

EXAMPLE 1

(51) Int. Cl.
    *G02B 13/04*     (2006.01)
    *G02B 13/16*     (2006.01)
    *G02B 27/00*     (2006.01)
    *G03B 21/14*     (2006.01)

(58) Field of Classification Search
    USPC .......................................... 359/362–366, 649
    See application file for complete search history.

(56) References Cited

U.S. PATENT DOCUMENTS

| | | |
|---|---|---|
| 2005/0088762 A1 | 4/2005 | Ohashi |
| 2010/0172022 A1* | 7/2010 | Lin ........................ G02B 13/16 |
| | | 359/434 |
| 2014/0036142 A1 | 2/2014 | Inoko |
| 2014/0307327 A1* | 10/2014 | Nagatoshi .............. G02B 13/04 |
| | | 359/649 |
| 2015/0077848 A1 | 3/2015 | Ichimura |
| 2015/0234157 A1 | 8/2015 | Ichimura |

FOREIGN PATENT DOCUMENTS

| | | |
|---|---|---|
| JP | 2014-029392 A | 2/2014 |
| JP | 2015-060062 A | 3/2015 |

\* cited by examiner

EXAMPLE 1

EXAMPLE 2

EXAMPLE 3

EXAMPLE 4

IMAGING OPTICAL SYSTEM, PROJECTION-TYPE DISPLAY APPARATUS, AND IMAGING APPARATUS

CROSS REFERENCE TO RELATED APPLICATIONS

The present application is a Divisional of U.S. application Ser. No. 15/602,527 filed on May 23, 2017, and claims priority under 35 U.S.C. § 119 to Japanese Patent Application No. 2016-104120 filed on May 25, 2016. The above application is hereby expressly incorporated by reference, in its entirety, into the present application.

BACKGROUND OF THE INVENTION

1. Field of the Invention

The present invention relates to an imaging optical system suitable for being used in a projection-type display apparatus having a light valve such as, particularly, a liquid crystal display device or a Digital Micromirror Device (DMD: Registered Trademark) mounted therein, a projection-type display apparatus including this imaging optical system, and an imaging apparatus including this imaging optical system.

2. Description of the Related Art

In recent years, projection-type display apparatuses (also called projectors), such as a liquid crystal display device or a DMD, having a light valve mounted therein have been in widespread use and have increased in performance.

In addition, with the recent improvement in the performance of a light valve, an imaging optical system which is combined with the light valve has required satisfactory aberration correction appropriate for the resolution of the light valve. Further, in consideration of use in a relatively narrow indoor space for the purpose of presentation or the like, an imaging optical system having a wider angle is strongly demanded.

In order to respond to such a demand, an imaging optical system is proposed in which an intermediate image is formed in a reduced-side optical system consisting of a plurality of lenses, and the image is re-formed likewise in a magnified-side optical system consisting of a plurality of lenses (see JP2014-029392A, JP2015-060062A, and JP2005-128286A).

In an imaging optical system constituted by only an optical system having no normal intermediate image formed thereon, in a case where an attempt is made to widen an angle by reducing a focal length, lenses on the magnified side become excessively large in any way. However, in the imaging optical system of an intermediate imaging type as described above, it is possible to shorten the back focus of the magnified-side optical system, and to reduce the magnified-side lens diameters of the magnified-side optical system. Therefore, the system is also suitable for widening an angle by reducing a focal length.

However, there are problems in that imaging optical systems of Examples 3 and 5 disclosed in JP2014-029392A are narrow in the angle of view, and that imaging optical systems of the other examples are wide in the angle of view but are large in lens diameter. In addition, there is a problem in that an imaging optical system disclosed in JP2015-060062A is large in lens diameter. In addition, there is a problem in that an imaging optical system disclosed in JP2005-128286A is large in distortion and is not sufficient in imaging performance.

SUMMARY OF THE INVENTION

The present invention is contrived in view of such circumstances, and an object thereof is to provide an imaging optical system having a wide angle of view in which various aberrations are appropriately corrected and a lens diameter is kept small, a projection-type display apparatus including this imaging optical system, and an imaging apparatus including this imaging optical system.

According to the present invention, there is provided an imaging optical system capable of projecting an image, displayed on an image display device disposed on a reduced-side conjugate plane, as a magnified image on a magnified-side conjugate plane, the system comprising, in order from a magnified side: a first optical system which is constituted by a plurality of lenses; and a second optical system which is constituted by a plurality of lenses, wherein the second optical system forms the image on the image display device as an intermediate image, the first optical system forms the intermediate image on the magnified-side conjugate plane, a height of a principal ray of light having a maximum angle of view becomes maximum on a lens surface of the whole system on the most magnified side, among heights of principal rays of light having a maximum angle of view on respective lens surfaces, and the following Conditional Expressions (1) and (2) are satisfied, $$0.03 < H \times |f|/(L \times I) < 0.09 \quad (1)$$

$$0.35 < I/dl \quad (2)$$

where H is a height of the principal ray of light having a maximum angle of view on a plane orthogonal to an optical axis through a point of intersection between the lens surface on the most magnified side and the optical axis, f is a focal length of the whole system, L is a distance on the optical axis between the lens surface on the most magnified side and a lens surface on a most reduced side, I is a maximum image height on the reduced side, and dl is a maximum air spacing on the optical axis within the system.

In the imaging optical system of the present invention, it is preferable to satisfy the following Conditional Expression (1-1) and/or (2-1).

$$0.04 < H \times |f|/(L \times I) < 0.08 \quad (1\text{-}1)$$

$$0.38 < I/dl < 0.55 \quad (2\text{-}1)$$

In addition, it is preferable to satisfy the following Conditional Expression (3), and more preferable to satisfy the following Conditional Expression (3-1), $$4 < b/a < 10 \quad (3)$$

$$5 < b/a < 8 \quad (3\text{-}1)$$

where b is a light flux diameter of a maximum image height in a meridian direction at an F-Number five times a design F-Number, and a is an on-axis light flux diameter at an F-Number five times the design F-Number. Meanwhile, the light flux diameters of a and b are set to light flux diameters on the magnified side rather than the lens surface on the most magnified side when a projection distance is set to be infinite. In addition, the position of a diaphragm for determining the F-Number when a and b are calculated is set to a position at which a principal ray of light and an optical axis intersect each other within the second optical system. In addition, the light flux diameter of b is set to a light flux diameter in a direction perpendicular to the principal ray of light.

In addition, it is preferable to satisfy the following Conditional Expression (4), and more preferable to satisfy the following Conditional Expression (4-1), $$0.8<H\times f^2/(fo\times I^2)<1.3 \quad (4)$$

$$0.84<H\times f^2/(fo\times I^2)<1.2 \quad (4\text{-}1)$$

where H is a height of the principal ray of light having a maximum angle of view on a plane orthogonal to an optical axis through a point of intersection between the lens surface on the most magnified side and the optical axis, f is a focal length of the whole system, fo is a focal length of the first optical system, and I is a maximum image height on the reduced side.

In addition, it is preferable to satisfy the following Conditional Expression (5), $$1<fo/|f|<1.8 \quad (5)$$

where fo is a focal length of the first optical system, and f is a focal length of the whole system.

In addition, it is preferable to satisfy the following Conditional Expression (6), $$1<enp/I<2 \quad (6)$$

where enp is a distance on the optical axis from the lens surface on the most magnified side to a pupil position on the magnified side, and I is a maximum image height on the reduced side.

Meanwhile, the pupil position is assumed to be determined by the principal ray of light having a maximum angle of view.

In addition, the imaging optical system further comprises: a positive meniscus lens, located adjacent to a magnified side or a reduced side of a position at which the intermediate image is formed, in which a concave surface is directed toward the reduced side; and a negative lens, located adjacent to the reduced side of the positive meniscus lens, in which the concave surface is directed toward the magnified side, and it is preferable to satisfy the following Conditional Expression (7), and more preferable to satisfy the following Conditional Expression (7-1), $$0<(Rpr+Rmf)/(Rpr-Rmf)<0.8 \quad (7)$$

$$0.2<(Rpr+Rmf)/(Rpr-Rmf)<0.6 \quad (7\text{-}1)$$

where Rpr is a radius of curvature of a surface of the positive meniscus lens on the reduced side, and Rmf is a radius of curvature of a surface of the negative lens on the magnified side.

According to the present invention, there is provided a projection-type display apparatus comprising: a light source; a light valve on which light from the light source is incident; and the imaging optical system of the present invention as an imaging optical system that projects an optical image of light optically modulated by the light valve onto a screen.

According to the present invention, there is provided an imaging apparatus comprising the imaging optical system of the present invention.

Meanwhile, the term "magnified side" means a projected side (screen side), and the screen side is assumed to be referred to as the magnified side, for the sake of convenience, even in a case of reduction projection. On the other hand, the term "reduced side" means an image display device side (light valve side), and the light valve side is assumed to be referred to as the reduced side, for the sake of convenience, even in a case of reduction projection.

In addition, the term "consist of" is intended to be allowed to include lenses having substantially no power, optical elements, such as a mirror, a diaphragm, a mask, cover glass, or a filter having no power, other than a lens, and the like, in addition to the things enumerated as components.

In addition, the term "lens group" is not necessarily constituted by a plurality of lenses, but may be constituted by only one lens.

In addition, the surface shape of the lens and the sign of the refractive power thereof are assumed to be those in a paraxial region in a case where an aspherical surface is included.

According to the present invention, there is provided an imaging optical system capable of projecting an image, displayed on an image display device disposed on a reduced-side conjugate plane, as a magnified image on a magnified-side conjugate plane, the system comprising, in order from a magnified side: a first optical system which is constituted by a plurality of lenses; and a second optical system which is constituted by a plurality of lenses, wherein the second optical system forms the image on the image display device as an intermediate image, the first optical system forms the intermediate image on the magnified-side conjugate plane, a height of a principal ray of light having a maximum angle of view becomes maximum on a lens surface of the whole system on a most magnified side, among heights of principal rays of light having a maximum angle of view on respective lens surfaces, and the following Conditional Expressions (1) and (2) are satisfied. Therefore, it is possible to form an imaging optical system having a wide angle of view in which various aberrations are appropriately corrected and a lens diameter is kept small.

$$0.03<H\times|f|/(L\times I)<0.09 \quad (1)$$

$$0.35<I/dl \quad (2)$$

Since the projection-type display apparatus of the present invention includes the imaging optical system of the present invention, it is possible to project a high-quality image with a wide angle of view, and to reduce the size of the apparatus.

Since the imaging apparatus of the present invention includes the imaging optical system of the present invention, it is possible to acquire a high-quality image with a wide angle of view, and to reduce the size of the apparatus.

DESCRIPTION OF THE PREFERRED EMBODIMENTS

Figure 1:
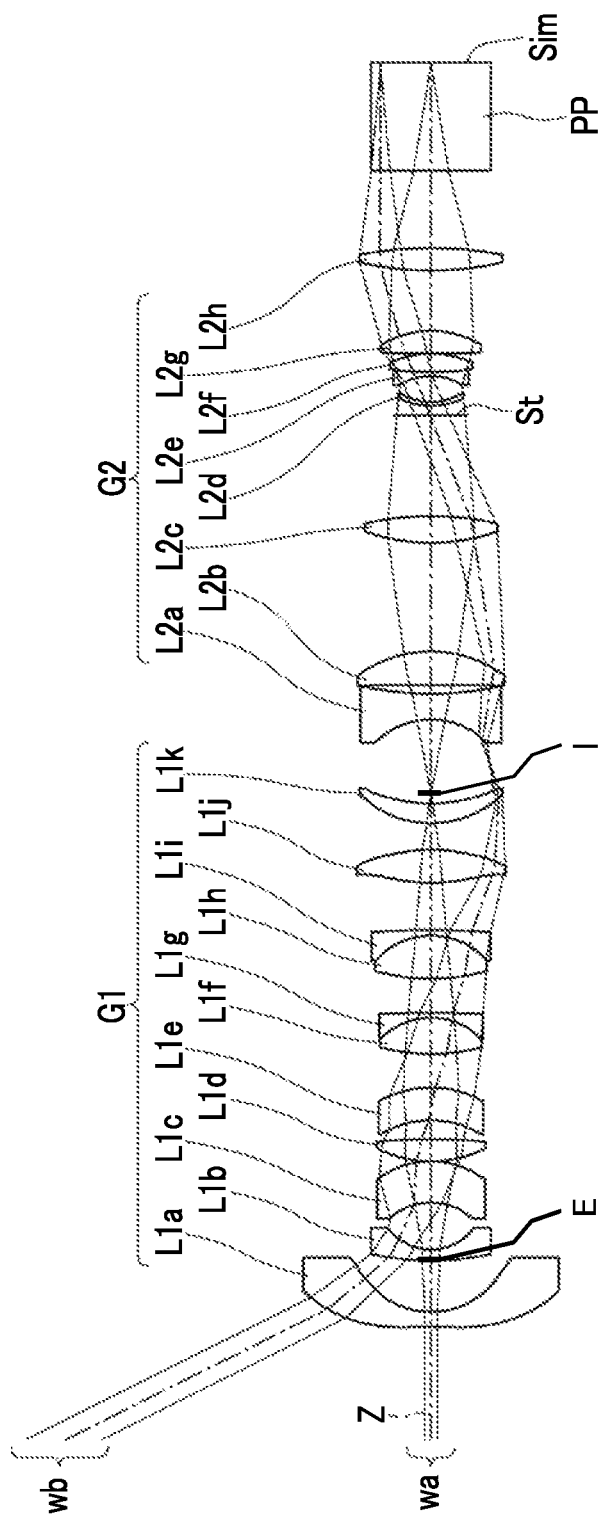
FIG. 1 is a cross-sectional view illustrating a configuration (in common with that of Example 1) of an imaging optical system according to an embodiment of the present invention.

Hereinafter, embodiments of the present invention will be described in detail with reference to the accompanying drawings. FIG. 1 is a cross-sectional view illustrating a configuration of an imaging optical system according to an embodiment of the present invention. The configuration example shown in FIG. 1 is in common with a configuration of an imaging optical system of Example 1 described later. In FIG. 1, an image display surface Sim side is a reduced side, a lens L1a side of a first optical system G1 is a magnified side, and a shown aperture diaphragm St does not necessarily indicates a size or a shape, but indicates a position on an optical axis Z. In addition, in FIG. 1, an on-axis light flux wa and a light flux wb of the maximum angle of view are also shown together.

This imaging optical system is mounted on, for example, a projection-type display apparatus, and can be used in projecting image information displayed on a light valve onto a screen. In FIG. 1, on the assumption of a case of being mounted on the projection-type display apparatus, an optical member PP assumed to be a filter, a prism and the like which are used in a color synthesis portion or an illumination light separation portion, and the image display surface Sim of the light valve located on the surface of the optical member PP on the reduced side are also shown together. In the projection-type display apparatus, a light flux to which image information is given on the image display surface Sim on an image display device is incident on this imaging optical system through the optical member PP, and is projected onto a screen, not shown, by this imaging optical system.

As shown in FIG. 1, the imaging optical system of the present embodiment consists of the first optical system G1 constituted by a plurality of lenses and a second optical system G2 constituted by a plurality of lenses, in order from the magnified side. The second optical system G2 is configured to form an image on the image display surface Sim as an intermediate image I, and the first optical system G1 is configured to form the intermediate image on a magnified-side conjugate plane.

In an optical system for projection constituted by only an optical system having no normal intermediate image formed thereon, in a case where an attempt is made to widen an angle by reducing a focal length, a lens on the magnified side becomes excessively large in any way. However, in an optical system for projection of a type in which intermediate imaging is performed as in the present embodiment, it is possible to shorten a back focus of the first optical system G1, and to reduce lens diameters of the first optical system G1 on the magnified side. Therefore, the system is suitable for widening an angle by reducing a focal length.

In addition, the optical system is configured such that the height of a principal ray of light having a maximum angle of view becomes maximum on the lens surface of the whole system on the most magnified side, among the heights of the principal rays of light having a maximum angle of view on respective lens surfaces. Thereby, it is possible to reduce a lens outside diameter while maintaining a wide angle of view.

In addition, it is configured to satisfy the following Conditional Expressions (1) and (2). The ratio value is not set to be equal to or less than the lower limit of Conditional Expression (1), and thus it is possible to appropriately correct, particularly, distortion and astigmatism, and to make both optical performance and a wide angle of view easy. The ratio value is not set to be equal to or greater than the upper limit of Conditional Expression (1), and thus it is possible to prevent lens diameters on the magnified side from increasing. The ratio value is not set to be equal to or less than the lower limit of Conditional Expression (2), and thus it is possible to prevent the entire length from increasing. Meanwhile, in a case where the following Conditional Expression (1-1) and/or (2-1) is satisfied, it is possible to make characteristics more satisfactory. The ratio value is not set to be equal to or greater than the upper limit of Conditional Expression (2-1), and thus it is possible to secure an appropriate lens distance, and to make it easy to correct lateral chromatic aberration and image plane curvature.

$$0.03 < H \times |f|/(L \times I) < 0.09 \quad (1)$$

$$0.04 < H \times |f|/(L \times I) < 0.08 \quad (1\text{-}1)$$

$$0.35 < I/dl \quad (2)$$

$$0.38 < I/dl < 0.55 \quad (2\text{-}1)$$

Here, H is a height of the principal ray of light having a maximum angle of view on a plane orthogonal to an optical axis through a point of intersection between the lens surface on the most magnified side and the optical axis, f is a focal length of the whole system, L is a distance on the optical axis between the lens surface on the most magnified side and a lens surface on a most reduced side, I is a maximum image height on the reduced side, and dl is a maximum air spacing on the optical axis within the system.

In the imaging optical system of the present embodiment, it is preferable to satisfy the following Conditional Expression (3). The ratio value is not set to be equal to or less than the lower limit of Conditional Expression (3), and thus it is possible to secure a peripheral light amount ratio even in a case where a lens is used which has a wide angle of view and in which various aberrations are satisfactorily corrected. The ratio value is not set to be equal to or greater than the upper limit of Conditional Expression (3), and thus it is possible to prevent a lens diameter from increasing. Meanwhile, in a case where the following Conditional Expression (3-1) is satisfied, it is possible to make characteristics more satisfactory.

$$4 < b/a < 10 \quad (3)$$

$$5 < b/a < 8 \quad (3\text{-}1)$$

Here, b is a light flux diameter of a maximum image height in a meridian direction at an F-Number five times a design F-Number, and a is an on-axis light flux diameter at an F-Number five times the design F-Number.

In addition, it is preferable to satisfy the following Conditional Expression (4). The ratio value is not set to be equal to or less than the lower limit of Conditional Expression (4), and thus it is possible to appropriately correct, particularly, distortion and astigmatism, and to make both optical performance and a wide angle of view easy. The ratio value is not set to be equal to or greater than the upper limit of Conditional Expression (4), and thus it is possible to prevent lens diameters on the magnified side from increasing. Meanwhile, in a case where the following Conditional Expression (4-1) is satisfied, it is possible to make characteristics more satisfactory.

$$0.8 < H \times f^2 / (fo \times I^2) < 1.3 \qquad (4)$$

$$0.84 < H \times f^2 / (fo \times I^2) < 1.2 \qquad (4\text{-}1)$$

Here, H is a height of the principal ray of light having a maximum angle of view on a plane orthogonal to an optical axis through a point of intersection between the lens surface on the most magnified side and the optical axis, f is a focal length of the whole system, fo is a focal length of the first optical system, and I is a maximum image height on the reduced side.

In addition, it is preferable to satisfy the following Conditional Expression (5). The ratio value is not set to be equal to or less than the lower limit of Conditional Expression (5), and thus it is possible to make it easy to correct spherical aberration, image plane curvature, and astigmatism. The ratio value is not set to be equal to or greater than the upper limit of Conditional Expression (5), and thus it is possible to prevent a lens diameter in the vicinity of an intermediate image formation position from increasing.

$$1 < fo/|f| < 1.8 \qquad (5)$$

Here, fo is a focal length of the first optical system, and f is a focal length of the whole system.

In addition, it is preferable to satisfy the following Conditional Expression (6). The ratio value is not set to be equal to or less than the lower limit of Conditional Expression (6), and thus it is possible to make it easy to correct distortion and astigmatism. The ratio value is not set to be equal to or greater than the upper limit of Conditional Expression (6), and thus it is possible to prevent lens diameters on the magnified side from increasing.

$$1 < enp/I < 2 \qquad (6)$$

Here, enp is a distance on the optical axis from the lens surface on the most magnified side to a pupil position E, shown in, for example, FIGS. 1-4, on the magnified side, and I is a maximum image height on the reduced side.

In addition, the imaging optical system includes a positive meniscus lens, located adjacent to a magnified side or a reduced side of a position at which the intermediate image is formed, in which a concave surface is directed toward the reduced side, and a negative lens, located adjacent to the reduced side of this positive meniscus lens, in which the concave surface is directed toward the magnified side, and it is preferable to satisfy the following Conditional Expression (7). The ratio value is not set to be equal to or less than the lower limit of Conditional Expression (7), and thus it is possible to prevent a lens outside diameter in the middle of the second optical system G2 from increasing. The ratio value is not set to be equal to or greater than the upper limit of Conditional Expression (7), and thus it is possible to prevent a lens outside diameter in the vicinity of the intermediate image formation position from increasing. Meanwhile, in a case where the following Conditional Expression (7-1) is satisfied, it is possible to make characteristics more satisfactory.

$$0 < (Rpr + Rmf)/(Rpr - Rmf) < 0.8 \qquad (7)$$

$$0.2 < (Rpr + Rmf)/(Rpr - Rmf) < 0.6 \qquad (7\text{-}1)$$

Here, Rpr is a radius of curvature of a surface of the positive meniscus lens on the reduced side, and Rmf is a radius of curvature of a surface of the negative lens on the magnified side.

Next, numerical value examples of the imaging optical system of the present invention will be described.

First, an imaging optical system of Example 1 will be described. FIG. 1 shows a cross-sectional view illustrating a configuration of the imaging optical system of Example 1. Meanwhile, in FIG. 1 and FIGS. 2 to 4 corresponding to Examples 2 to 4 described later, an image display surface Sim side is a reduced side, a lens L1a side of a first optical system G1 is a magnified side, and a shown aperture diaphragm St does not necessarily indicates a size or a shape, but indicates a position on the optical axis Z. In addition, in FIGS. 1 to 4, an on-axis light flux wa and a light flux wb of the maximum angle of view are also shown together.

The imaging optical system of Example 1 is constituted by the first optical system G1 and the second optical system G2 in order from the magnified side. The first optical system G1 is constituted by eleven lenses of lenses L1a to L1k. The second optical system G2 is constituted by eight lenses of lenses L2a to L2h.

Table 1 shows lens data of the imaging optical system of Example 1, Table 2 shows data relating to specifications, and Table 3 shows data relating to aspherical coefficients. In the following, the meanings of symbols in the tables will be described by taking an example of those in Example 1, but the same is basically true of Examples 2 to 4.

In the lens data of Table 1, the column of a surface number indicates surface numbers sequentially increasing toward the reduced side with the surface of a component on the most magnified side set to a first surface, the column of a radius of curvature indicates radii of curvature of respective surfaces, and the column of a surface spacing indicates distances on the optical axis Z between the respective surfaces and the next surfaces. In addition, the column of n indicates refractive indexes of respective optical elements with respect to a d line (wavelength of 587.6 nm), and the column of ν indicates Abbe numbers of the respective optical elements with respect to the d line (wavelength of 587.6 nm). Here, the sign of the radius of curvature is set to be positive in a case where a surface shape is convex on the magnified side, and is set to be negative in a case where a surface shape is convex on the reduced side. The lens data also indicates the aperture diaphragm St and the optical member PP together. In the place of a surface number of a surface equivalent to the aperture diaphragm St, a term of (diaphragm) is written together with the surface number.

The data relating to specifications of Table 2 indicates values of a focal length f, a back focus Bf, an F-Number FNo, and the total angle of view 2ω.

Meanwhile, numerical values shown in data relating to basic lens data and specifications are standardized so that the focal length of the whole system is set to −1. In addition, the numerical values of each table are rounded off to predetermined decimal places.

In the lens data of Table 1, mark * is attached to the surface number of an aspherical surface, and the numerical values of a paraxial radius of curvature are indicated as the radius of curvature of the aspherical surface. The data relating to the aspherical coefficients of Table 3 indicates surface numbers of the aspherical surfaces and aspherical coefficients relating to these aspherical surfaces. "E−n" (n is an integer) in the numerical values of the aspherical coefficients of Table 3 means "×10$^{-n}$". The aspherical coefficients are values of respective coefficients KA and Am (m=3 to up to 18) in an aspherical expression represented by the following expression.

$$Zd = C \cdot h^2 / \{1 + (1 - KA \cdot C^2 \cdot h^2)^{1/2}\} \Sigma Am \cdot h^m$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis), C is a reciprocal of the paraxial radius of curvature, and KA and Am are aspherical coefficients (m=3 to up to 18).

TABLE 1

Example 1: Lens data (n and ν are based on the d line)

| SURFACE NUMBER | RADIUS OF CURVATURE | SURFACE SPACING | n | ν |
|---|---|---|---|---|
| *1 | −11.9824 | 0.5912 | 1.58313 | 59.46 |
| *2 | 4.2802 | 2.0112 | | |
| 3 | 11.3341 | 0.4223 | 1.83481 | 42.72 |
| 4 | 2.0637 | 1.8461 | | |
| 5 | −2.3698 | 1.6063 | 1.83481 | 42.72 |
| 6 | −3.4655 | 0.0050 | | |
| 7 | 4.6700 | 0.8559 | 1.77250 | 49.60 |
| 8 | −25.2694 | 0.7514 | | |
| 9 | −3.7273 | 1.2782 | 1.80610 | 33.27 |
| 10 | −4.1602 | 1.3117 | | |
| 11 | 7.5741 | 1.4296 | 1.59282 | 68.62 |
| 12 | −2.7352 | 0.1828 | 1.71736 | 29.52 |
| 13 | −73.2107 | 1.3385 | | |
| 14 | 7.8650 | 1.6911 | 1.49700 | 81.61 |
| 15 | −2.8675 | 0.2051 | 1.80518 | 25.46 |
| 16 | −42.3621 | 1.8543 | | |
| *17 | 6.4852 | 1.3101 | 1.58313 | 59.46 |
| *18 | −4.8774 | 1.0238 | | |
| 19 | 3.9852 | 0.7768 | 1.84666 | 23.78 |
| 20 | 6.2029 | 3.2834 | | |
| 21 | −3.0932 | 1.0135 | 1.51742 | 52.43 |
| 22 | 12.9587 | 0.3367 | | |
| 23 | −346.6075 | 1.3162 | 1.80000 | 29.84 |
| 24 | −4.7977 | 4.2562 | | |
| 25 | 7.7867 | 1.0402 | 1.59282 | 68.62 |
| 26 | −11.6091 | 3.8300 | | |
| 27 (DIAPHRAGM) | ∞ | 0.4856 | | |
| 28 | 2.6531 | 0.1534 | 1.51742 | 52.43 |
| 29 | 2.2689 | 1.0210 | | |
| 30 | −2.2729 | 0.1454 | 1.84666 | 23.78 |
| 31 | 10.1197 | 0.7284 | 1.59282 | 68.62 |
| 32 | −3.8164 | 0.0051 | | |
| 33 | 45.4997 | 0.8863 | 1.59282 | 68.62 |
| 34 | −3.6908 | 2.3577 | | |
| 35 | 12.0795 | 0.8812 | 1.89286 | 20.36 |
| 36 | −15.0017 | 3.0406 | | |
| 37 | ∞ | 4.2230 | 1.51633 | 64.14 |
| 38 | ∞ | 0.0030 | | |

TABLE 2

Example 1: Specifications

| f′ | −1.00 |
|---|---|
| Bf′ | 5.82 |
| FNo. | 2.05 |
| 2ω[°] | 126.6 |

TABLE 3

Example 1: Aspherical coefficients

| SURFACE NUMBER | 1 | 2 |
|---|---|---|
| KA | −3.22710352E−01 | −5.12420208E+00 |
| A3 | 2.77841807E−02 | 4.78947876E−02 |
| A4 | 2.85276272E−04 | −2.60866800E−02 |
| A5 | −1.03627997E−03 | 3.33058901E−02 |
| A6 | 1.08380363E−04 | −2.57078731E−02 |
| A7 | 1.62391178E−05 | 1.42004634E−02 |
| A8 | −3.01306781E−06 | −5.56679848E−03 |
| A9 | 1.84123627E−08 | 1.57318981E−03 |
| A10 | 3.91729924E−08 | −3.26527884E−04 |
| A11 | −3.75509981E−09 | 4.96148861E−05 |
| A12 | −1.82713607E−10 | −5.48184635E−06 |
| A13 | 3.00357220E−11 | 4.27780457E−07 |
| A14 | −2.54501112E−12 | −2.38316223E−08 |
| A15 | 1.10646340E−12 | 2.96299823E−10 |
| A16 | 1.15328327E−13 | −2.06984108E−10 |
| A17 | 0.00000000E+00 | 0.00000000E+00 |
| A18 | 0.00000000E−00 | 0.00000000E+00 |

| SURFACE NUMBER | 17 | 18 |
|---|---|---|
| KA | 1.45666692E−01 | −1.49999945E+01 |
| A3 | −4.10191592E−03 | −1.22975751E−02 |
| A4 | 8.80229915E−03 | 1.47531149E−02 |
| A5 | −6.87678586E−03 | −3.26414061E−03 |
| A6 | 3.65219363E−03 | −2.33907692E−03 |
| A7 | −4.01407946E−03 | 1.26837185E−03 |
| A8 | 2.63264761E−03 | −3.92634934E−04 |
| A9 | −8.32233769E−04 | 1.25241685E−04 |
| A10 | 6.89229504E−05 | −2.49278838E−05 |
| A11 | 1.78029344E−05 | 4.39416157E−07 |
| A12 | 5.19477138E−06 | 5.36948473E−08 |
| A13 | −5.40371430E−06 | 2.52132806E−07 |
| A14 | 1.25757478E−06 | −7.98650726E−08 |
| A15 | −1.11289734E−07 | 8.69366896E−09 |
| A16 | 2.06167105E−09 | −5.41667909E−10 |

Figure 5:
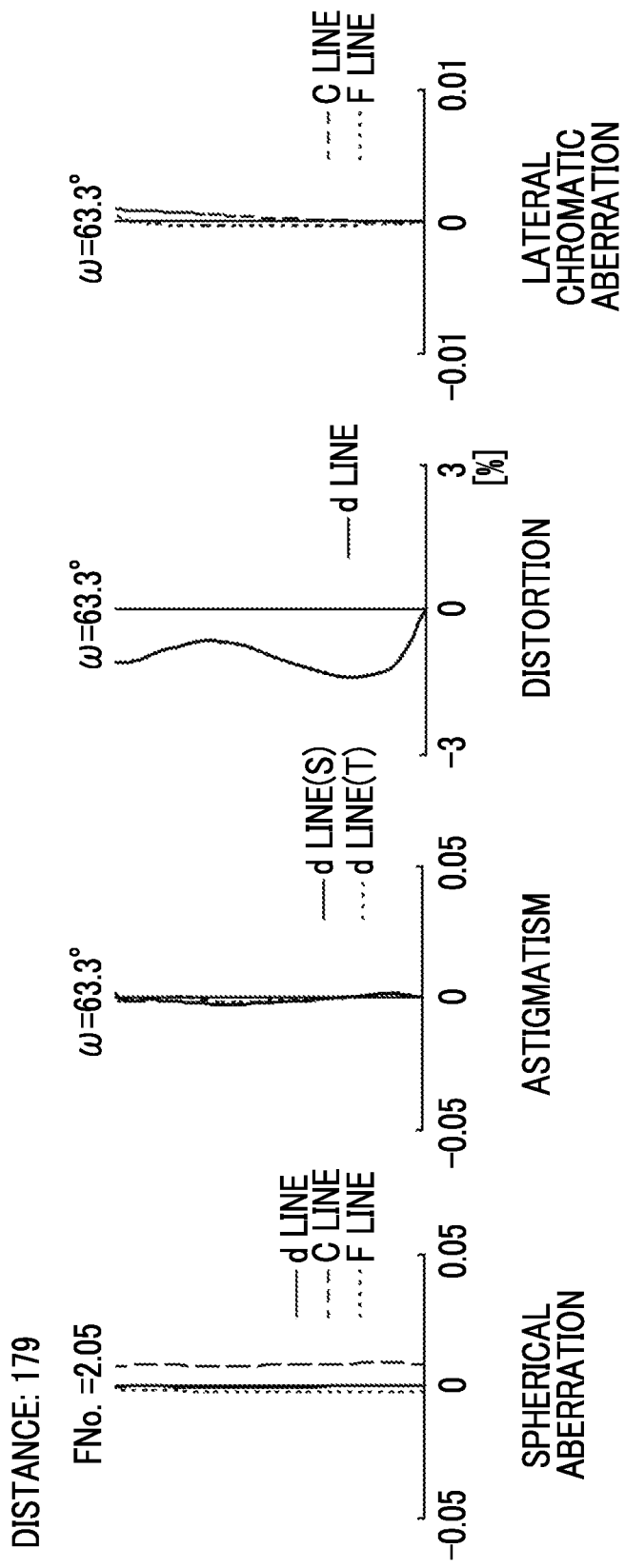
FIG. 5 is a diagram of aberrations of an imaging optical system of Example 1 of the present invention.

FIG. 5 shows a diagram of aberrations of the imaging optical system of Example 1. Meanwhile, FIG. 5 shows an aberration diagram at a predetermined projection distance (indicated in the drawing), and shows spherical aberration, astigmatism, distortion, and lateral chromatic aberration, in order from the left side. The diagram of aberrations indicating spherical aberration, astigmatism, and distortion indicates aberrations in which the d line (wavelength of 587.6 nm) is used as a reference wavelength. In the spherical aberration diagram, aberrations relating to the d line (wavelength of 587.6 nm), a C line (wavelength of 656.3 nm), and an F line (wavelength of 486.1 nm) are indicated by a solid line, a long dashed line, and a short dashed line, respectively. In the astigmatism diagram, aberrations in a sagittal direction and a tangential direction are indicated by a solid line and a short dashed line, respectively. In the lateral chromatic aberration diagram, aberrations relating to the C line (wavelength of 656.3 nm) and the F line (wavelength of 486.1 nm) are indicated by a long dashed line and a short dashed line, respectively. FNo. in the spherical aberration diagram means an F-Number, and ω in the other aberration diagrams means a half angle of view.

In the description of Example 1, symbols, meanings, and description methods of the respective pieces of data are the same as those in the following examples unless otherwise noted, and thus the repeated description thereof will be omitted below.

Figure 2:
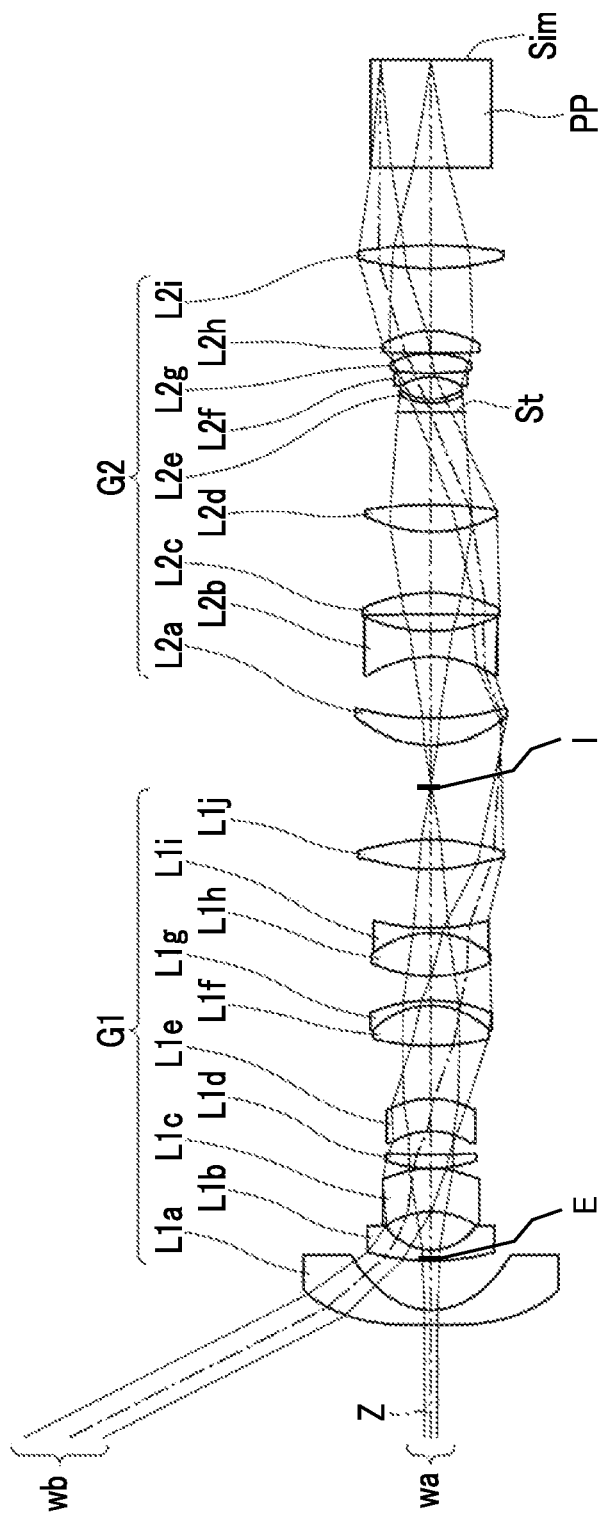
FIG. 2 is a cross-sectional view illustrating a configuration of an imaging optical system of Example 2 of the present invention.
Figure 6:
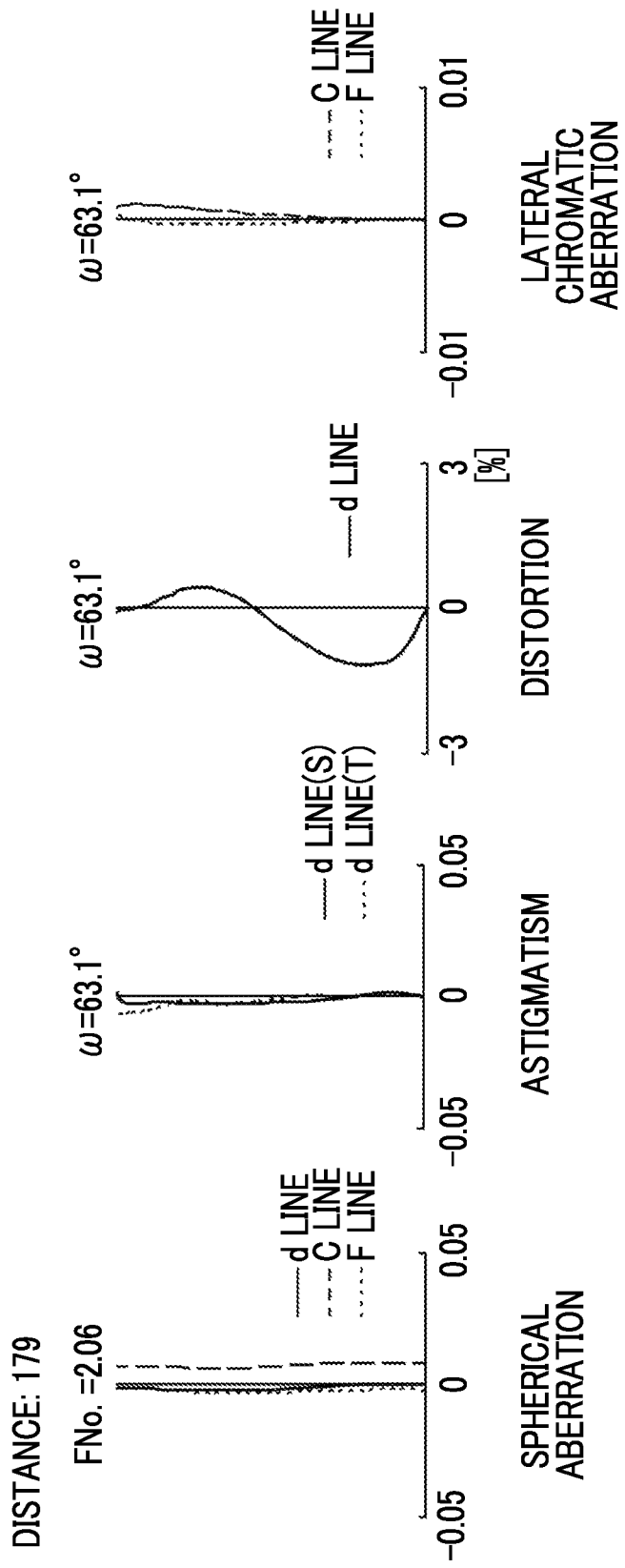
FIG. 6 is a diagram of aberrations of an imaging optical system of Example 2 of the present invention.

Next, an imaging optical system of Example 2 will be described. FIG. 2 shows a cross-sectional view illustrating a configuration of the imaging optical system of Example 2. In the imaging optical system of Example 2, the first optical system G1 is constituted by ten lenses of lenses L1a to L1j, and the second optical system G2 is constituted by nine lenses of lenses L2a to L2i. In addition, Table 4 shows lens data of the imaging optical system of Example 2, Table 5 shows data relating to specifications, Table 6 shows data relating to aspherical coefficients, and FIG. 6 shows a diagram of aberrations.

TABLE 4

Example 2: Lens data (n and ν are based on the d line)

| SURFACE NUMBER | RADIUS OF CURVATURE | SURFACE SPACING | n | ν |
|---|---|---|---|---|
| *1 | −28.4161 | 0.5914 | 1.58313 | 59.46 |
| *2 | 3.1877 | 1.9307 | | |
| 3 | 9.5077 | 0.4223 | 1.80400 | 46.58 |
| 4 | 2.1215 | 1.4840 | | |
| 5 | −3.1760 | 1.6897 | 1.60311 | 60.64 |
| 6 | −4.3955 | 0.0051 | | |
| 7 | 5.0478 | 0.5524 | 1.83481 | 42.72 |
| 8 | 44.6210 | 0.9073 | | |
| 9 | −2.8724 | 1.2679 | 1.80000 | 29.84 |
| 10 | −3.5729 | 2.0894 | | |
| 11 | 9.8123 | 1.5594 | 1.59282 | 68.62 |
| 12 | −3.1684 | 0.2067 | 1.71736 | 29.52 |
| 13 | −6.0100 | 0.9589 | | |
| 14 | 5.5703 | 1.6775 | 1.49700 | 81.61 |
| 15 | −3.6845 | 0.1990 | 1.80518 | 25.46 |
| 16 | 8.6544 | 2.2997 | | |
| *17 | 6.9267 | 1.1768 | 1.58313 | 59.46 |
| *18 | −5.2010 | 3.6773 | | |
| 19 | 4.4395 | 1.0397 | 1.84666 | 23.78 |
| 20 | 10.9265 | 2.3957 | | |
| 21 | −4.6100 | 1.0138 | 1.51742 | 52.43 |
| 22 | 6.4147 | 0.6609 | | |
| 23 | −99.7684 | 0.8315 | 1.80000 | 29.84 |
| 24 | −6.1678 | 2.3912 | | |
| 25 | 5.6136 | 1.0559 | 1.59282 | 68.62 |
| 26 | −17.1210 | 3.5400 | | |
| 27 (DIAPHRAGM) | ∞ | 0.4475 | | |
| 28 | 2.6166 | 0.1477 | 1.51742 | 52.43 |
| 29 | 2.2266 | 0.8724 | | |
| 30 | −2.1642 | 0.1433 | 1.84666 | 23.78 |
| 31 | 10.5923 | 0.7858 | 1.59282 | 68 62 |
| 32 | −3.4882 | 0.0049 | | |
| 33 | 48.6216 | 0.8672 | 1.59282 | 68.62 |
| 34 | −3.7327 | 2.4441 | | |
| 35 | 10.5646 | 0.9083 | 1.89286 | 20.36 |
| 36 | −17.5673 | 3.0415 | | |
| 37 | ∞ | 4.2243 | 1.51633 | 64.14 |
| 38 | ∞ | 0.0029 | | |

TABLE 5

Example 2: Specifications

| f | −1.00 |
|---|---|
| Bf | 5.82 |
| FNo. | 2.06 |
| 2ω[°] | 126.2 |

TABLE 6

Example 2: Aspherical coefficients

| SURFACE NUMBER | 1 | 2 |
|---|---|---|
| KA | −7.62985147E−06 | −1.59640105E+00 |
| A3 | 1.91408828E−02 | 3.78525744E−02 |
| A4 | 7.79071137E−04 | −2.63303267E−02 |
| A5 | −9.89629774E−04 | 3.31670557E−02 |
| A6 | 1.08015681E−04 | −2.57447646E−02 |
| A7 | 1.63122617E−05 | 1.41563539E−02 |
| A8 | −2.93147023E−06 | −5.55663212E−03 |
| A9 | 2.66031250E−08 | 1.56846843E−03 |
| A10 | 3.80339069E−08 | −3.25360687E−04 |
| A11 | −4.11032685E−09 | 4.96325958E−05 |
| A12 | −3.02625387E−10 | −5.34511402E−06 |
| A13 | 1.33747722E−11 | 4.22571950E−07 |
| A14 | −3.90030584E−12 | −2.06020966E−08 |
| A15 | 1.54060542E−12 | 2.09403135E−10 |
| A16 | 4.04930765E−13 | −4.16926444E−10 |
| A17 | 0.00000000E−00 | 0.00000000E+00 |
| A18 | 0.00000000E−00 | 0.00000000E+00 |

| SURFACE NUMBER | 17 | 18 |
|---|---|---|
| KA | 4.72767629E−01 | −1.34228925E+01 |
| A3 | −4.91751518E−03 | −1.11356946E−02 |
| A4 | 1.05764524E−02 | 1.61799985E−02 |
| A5 | −6.54558089E−03 | −3.04716398E−03 |
| A6 | 3.64498152E−03 | −2.31918247E−03 |
| A7 | −4.01192533E−03 | 1.26375715E−03 |
| A8 | 2.62506077E−03 | −3.95728833E−04 |
| A9 | −8.30106731E−04 | 1.25063790E−04 |
| A10 | 6.87459767E−05 | −2.49054453E−05 |
| A11 | 1.77334354E−05 | 4.56941844E−07 |
| A12 | 5.18467948E−06 | 6.99499362E−08 |
| A13 | −5.38536547E−06 | 2.54779603E−07 |
| A14 | 1.25242824E−06 | −7.88546454E−08 |
| A15 | −1.10682377E−07 | 9.04308229E−09 |
| A16 | 2.23983419E−09 | −6.33101039E−10 |

Figure 3:
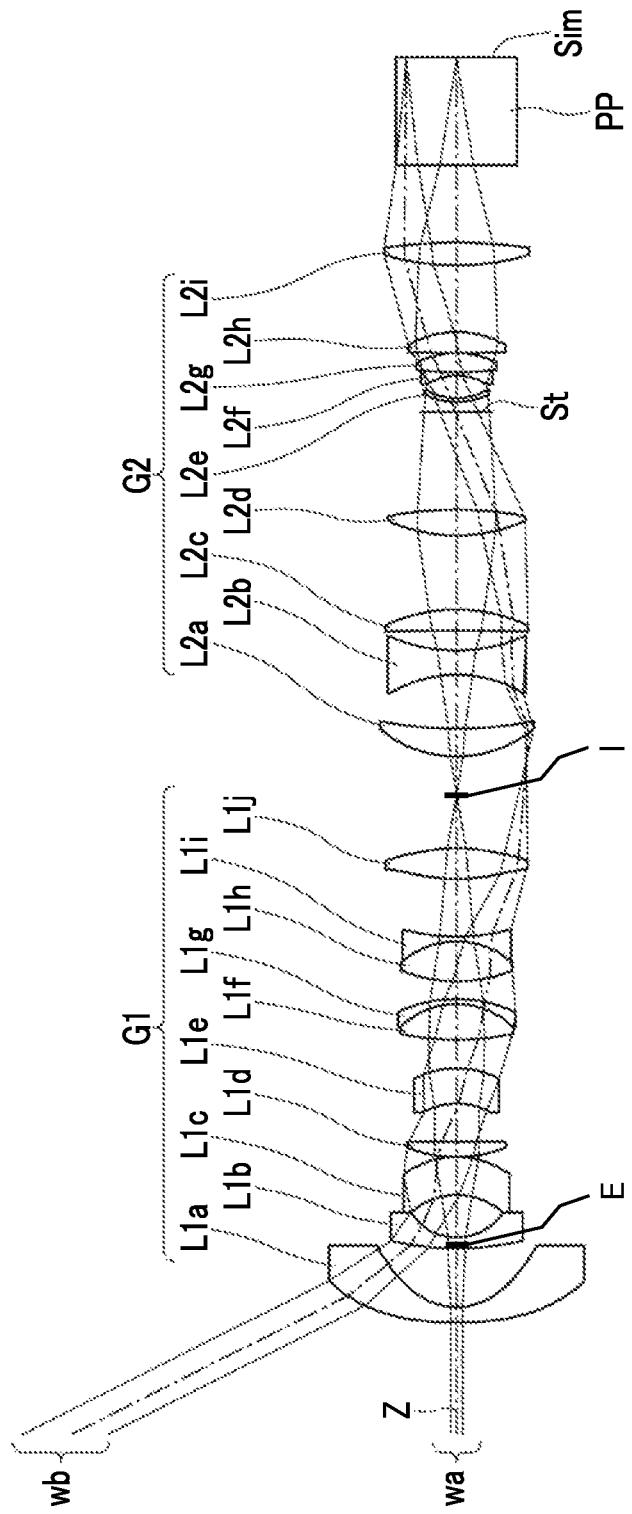
FIG. 3 is a cross-sectional view illustrating a configuration of an imaging optical system of Example 3 of the present invention.
Figure 7:
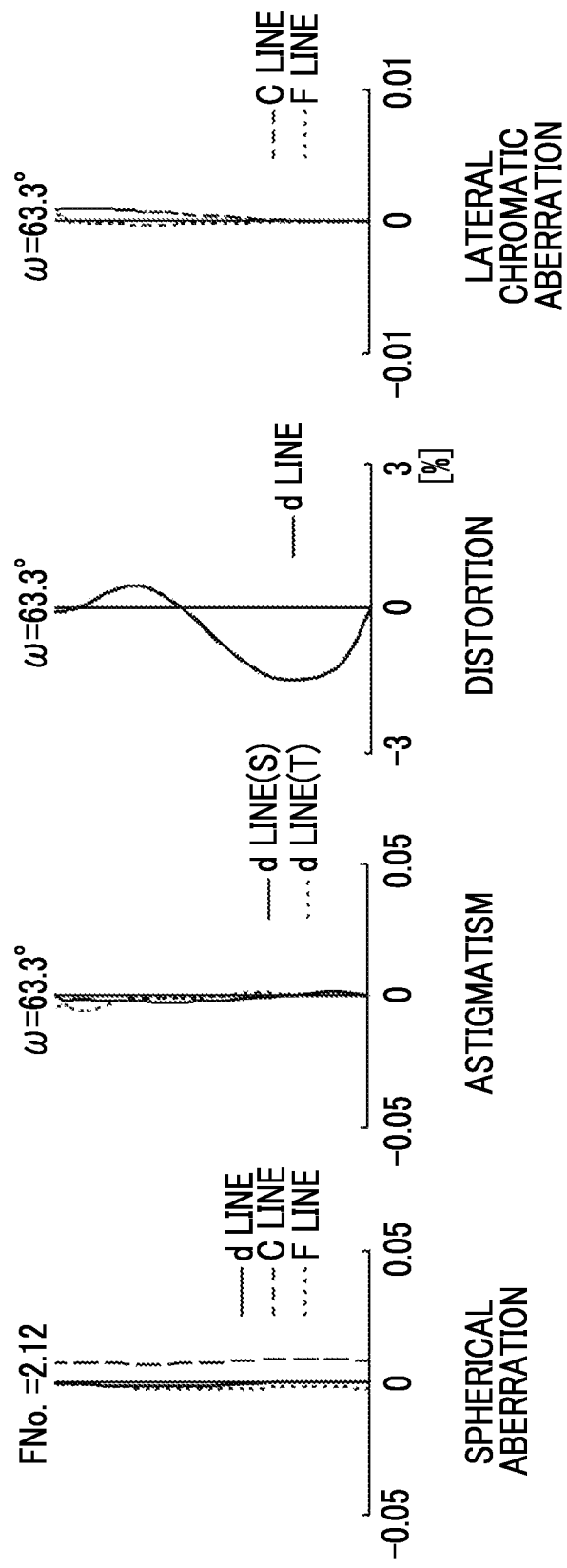
FIG. 7 is a diagram of aberrations of an imaging optical system of Example 3 of the present invention.

Next, an imaging optical system of Example 3 will be described. FIG. 3 shows a cross-sectional view illustrating a configuration of the imaging optical system of Example 3. The imaging optical system of Example 3 has the same lens number configuration as that in Example 2. In addition, Table 7 shows lens data of the imaging optical system of Example 3, Table 8 shows data relating to specifications, Table 9 shows data relating to aspherical coefficients, and FIG. 7 shows a diagram of aberrations.

TABLE 7

Example 3: Lens data (n and ν are based on the d line)

| SURFACE NUMBER | RADIUS OF CURVATURE | SURFACE SPACING | n | ν |
|---|---|---|---|---|
| *1 | 52.5341 | 0.5972 | 1.58313 | 59.46 |
| *2 | 2.8027 | 2.3214 | | |
| 3 | 11.3237 | 0.4264 | 1.80400 | 46.58 |
| 4 | 2.1599 | 1.6802 | | |
| 5 | −2.7245 | 1.5025 | 1.60311 | 60.64 |
| 6 | −3.5451 | 0.0051 | | |
| 7 | 5.3883 | 0.5966 | 1.83481 | 42.72 |
| 8 | −793.2892 | 1.5071 | | |
| 9 | −2.8089 | 1.3992 | 1.80000 | 29.84 |
| 10 | −3.6006 | 1.1288 | | |
| 11 | 10.4608 | 1.4124 | 1.59282 | 68.62 |
| 12 | −3.1453 | 0.1986 | 1.71736 | 29.52 |
| 13 | −5.4261 | 0.7023 | | |
| 14 | 5.8797 | 1.5715 | 1.49700 | 81.61 |
| 15 | −3.3228 | 0.1902 | 1.80518 | 25.46 |
| 16 | 7.8400 | 2.2877 | | |
| *17 | 7.0627 | 1.2200 | 1.58313 | 59.46 |
| *18 | −5.6310 | 3.6208 | | |

TABLE 7-continued

Example 3: Lens data (n and ν are based on the d line)

| SURFACE NUMBER | RADIUS OF CURVATURE | SURFACE SPACING | n | ν |
|---|---|---|---|---|
| 19 | 4.8027 | 1.0728 | 1.84666 | 23.78 |
| 20 | 15.3423 | 2.1318 | | |
| 21 | −5.1283 | 0.9577 | 1.51742 | 52.43 |
| 22 | 6.6360 | 0.7944 | | |
| 23 | −80.2773 | 0.8284 | 1.80000 | 29.84 |
| 24 | −6.5675 | 2.9250 | | |
| 25 | 6.6107 | 1.0225 | 1.59282 | 68.62 |
| 26 | −14.3055 | 3.7544 | | |
| 27 (DIAPHRAGM) | ∞ | 0.5019 | | |
| 28 | 2.8482 | 0.1521 | 1.51742 | 52.43 |
| 29 | 2.3826 | 0.8867 | | |
| 30 | −2.2616 | 0.1453 | 1.84666 | 23.78 |
| 31 | 15.2410 | 0.7502 | 1.59282 | 68.62 |
| 32 | −3.4929 | 0.0049 | | |
| 33 | 84.7093 | 0.8300 | 1.59282 | 68.62 |
| 34 | −3.7833 | 2.6338 | | |
| 35 | 10.1154 | 0.8983 | 1.89286 | 20.36 |
| 36 | −20.1689 | 3.0713 | | |
| 37 | ∞ | 4.2658 | 1.51633 | 64.14 |
| 38 | ∞ | 0.0027 | | |

TABLE 8

Example 3: Specifications

| | |
|---|---|
| f' | −1.00 |
| Bf | 5.88 |
| FNo. | 2.12 |
| 2ω[°] | 126.6 |

TABLE 9

Example 3: Aspherical coefficients

| SURFACE NUMBER | 1 | 2 |
|---|---|---|
| KA | −7.62987440E−06 | −4.50211776E−01 |
| A3 | 1.45528522E−02 | 3.31761059E−02 |
| A4 | 7.71878026E−04 | −2.54782717E−02 |
| A5 | −9.34295098E−04 | 3.18914598E−02 |
| A6 | 1.03352289E−04 | −2.45305383E−02 |
| A7 | 1.54271141E−05 | 1.33484956E−02 |
| A8 | −2.72924766E−06 | −5.19201669E−03 |
| A9 | 2.70844544E−08 | 1.45117474E−03 |
| A10 | 3.52166938E−08 | −2.97939276E−04 |
| A11 | −3.70029058E−09 | 4.50197003E−05 |
| A12 | −2.74795466E−10 | −4.80144694E−06 |
| A13 | 1.37169643E−11 | 3.75865268E−07 |
| A14 | −5.25704973E−12 | −1.79165936E−08 |
| A15 | 1.27601696E−12 | 1.82308650E−10 |
| A16 | 3.55604225E−13 | −3.60177701E−10 |
| A17 | 0.00000000E+00 | 0.00000000E+00 |
| A18 | 0.00000000E+00 | 0.00000000E+00 |

| SURFACE NUMBER | 17 | 18 |
|---|---|---|
| KA | 4.61874658E−01 | −1.35252030E+01 |
| A3 | −6.99253997E−03 | −1.42198197E−02 |
| A4 | 1.04169830E−02 | 1.59684585E−02 |
| A5 | −6.31224549E−03 | −2.95889409E−03 |
| A6 | 3.46931526E−03 | −2.21595129E−03 |
| A7 | −3.78428599E−03 | 1.18999835E−03 |
| A8 | 2.45175777E−03 | −3.69946897E−04 |
| A9 | −7.67949673E−04 | 1.15769453E−04 |
| A10 | 6.29630174E−05 | −2.27571703E−05 |
| A11 | 1.60409670E−05 | 3.67481869E−07 |
| A12 | 4.65681099E−06 | 5.89317440E−08 |
| A13 | −4.79058121E−06 | 2.26529118E−07 |

TABLE 9-continued

Example 3: Aspherical coefficients

| A14 | 1.10328635E−06 | −6.94965844E−08 |
| A15 | −9.64617926E−08 | 7.89814479E−09 |
| A16 | 1.93108926E−09 | −5.73561631E−10 |

Figure 4:
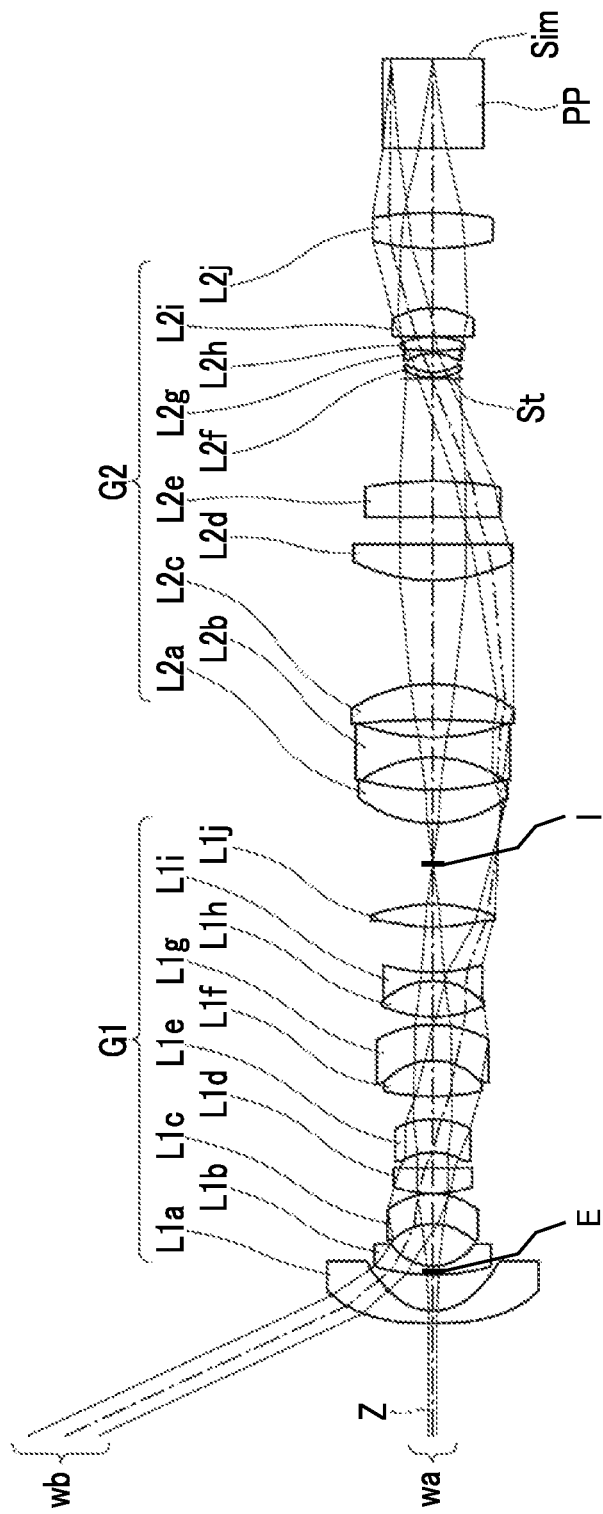
FIG. 4 is a cross-sectional view illustrating a configuration of an imaging optical system of Example 4 of the present invention.
Figure 8:
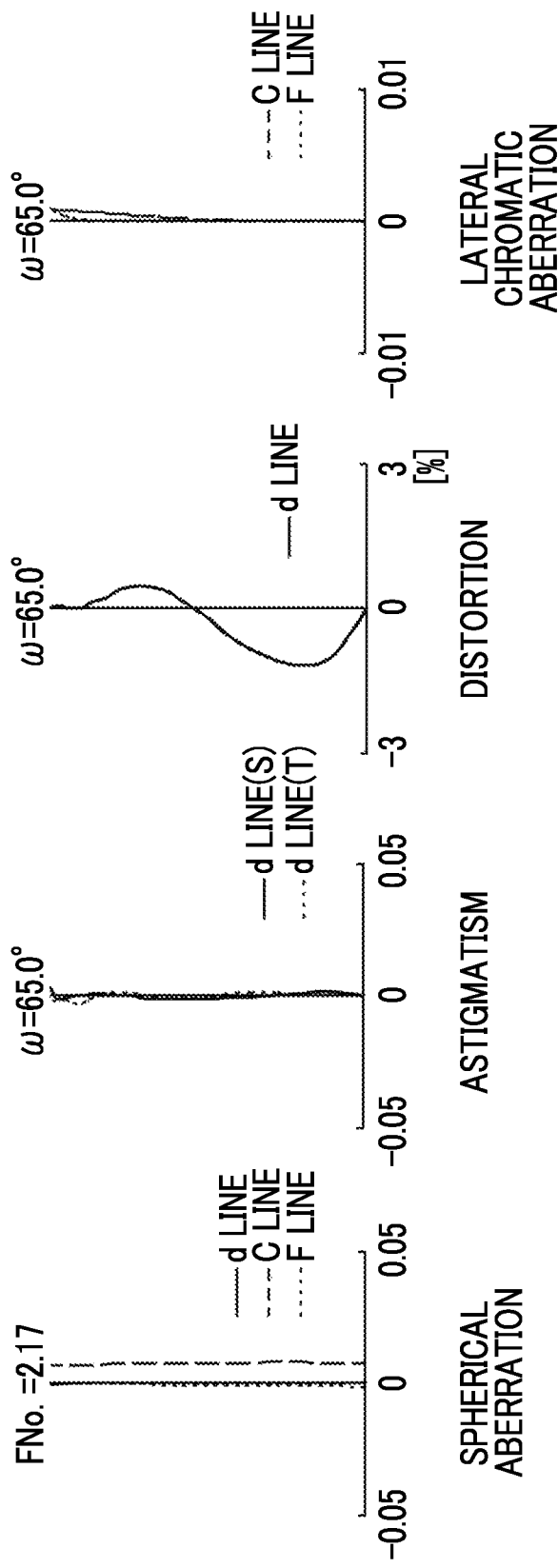
FIG. 8 is a diagram of aberrations of an imaging optical system of Example 4 of the present invention.

Next, an imaging optical system of Example 4 will be described. FIG. 4 shows a cross-sectional view illustrating a configuration of the imaging optical system of Example 4. In the imaging optical system of Example 4, the first optical system G1 is constituted by ten lenses of lenses L1a to L1j, and the second optical system G2 is also constituted by ten lenses of lenses L2a to L2j. In addition, Table 10 shows lens data of the imaging optical system of Example 4, Table 11 shows data relating to specifications, Table 12 shows data relating to aspherical coefficients, and FIG. 8 shows a diagram of aberrations.

TABLE 10

Example 4: Lens data (n and ν are based on the d line)

| SURFACE NUMBER | RADIUS OF CURVATURE | SURFACE SPACING | n | ν |
|---|---|---|---|---|
| *1 | 198.7971 | 0.6451 | 1.58313 | 59.46 |
| *2 | 3.1209 | 1.8593 | | |
| 3 | 10.5146 | 0.4608 | 1.80400 | 46.58 |
| 4 | 2.5757 | 2.1612 | | |
| 5 | −2.9608 | 1.5682 | 1.60311 | 60.64 |
| 6 | −3.5387 | 0.0055 | | |
| 7 | 6.2008 | 1.3089 | 1.83481 | 42.72 |
| 8 | 82.8756 | 0.8117 | | |
| 9 | −3.0657 | 1.7106 | 1.80000 | 29.84 |
| 10 | −3.9061 | 1.1792 | | |
| 11 | 12.1231 | 1.8450 | 1.59282 | 68.62 |
| 12 | −3.3382 | 1.8432 | 1.71736 | 29.52 |
| 13 | −5.7610 | 0.4147 | | |
| 14 | 6.4969 | 1.8450 | 1.49700 | 81.61 |
| 15 | −3.6997 | 0.4489 | 1.80518 | 25.46 |
| 16 | 8.5451 | 2.3338 | | |
| *17 | 8.6197 | 1.1889 | 1.58313 | 59.46 |
| *18 | −5.7503 | 4.1673 | | |
| 19 | 6.1652 | 1.7301 | 1.84666 | 23.78 |
| 20 | 13.9977 | 1.6516 | | |
| 21 | −6.3486 | 1.0462 | 1.51742 | 52.43 |
| 22 | 11.0818 | 0.9082 | | |
| 23 | −38.6161 | 1.8434 | 1.80000 | 29.84 |
| 24 | −7.4256 | 5.3454 | | |
| 25 | 9.0376 | 1.8432 | 1.59282 | 68.62 |
| 26 | 665.2770 | 1.4221 | | |
| 27 | −585.3151 | 1.8432 | 1.59282 | 68.62 |
| 28 | −20.2843 | 5.1440 | | |
| 29 (DIAPHRAGM) | ∞ | 0.2013 | | |
| 30 | 3.1704 | 0.2903 | 1.51742 | 52.43 |
| 31 | 2.6705 | 0.9468 | | |
| 32 | −2.6031 | 0.1549 | 1.84666 | 23.78 |
| 33 | 14.1022 | 0.7217 | 1.59282 | 63.62 |
| 34 | −4.0685 | 0.0056 | | |
| 35 | 1211.7848 | 1.4617 | 1.59282 | 68.62 |
| 36 | −4.1344 | 3.0837 | | |
| 37 | 12.3683 | 1.8434 | 1.89286 | 20.36 |
| 38 | −18.2321 | 3.3178 | | |
| 39 | ∞ | 4.6081 | 1.51633 | 64.14 |
| 40 | ∞ | 0.0026 | | |

TABLE 11

Example 4: Specifications

| | |
|---|---|
| f | −1.00 |
| Bf | 6.35 |
| FNo. | 2.17 |
| 2ω[°] | 130.0 |

TABLE 12

Example 4: Aspherical coefficients

| SURFACE NUMBER | 1 | 2 |
|---|---|---|
| KA | −7.77493017E−06 | −5.23511927E−01 |
| A3 | 1.32196373E−02 | 2.80785720E−02 |
| A4 | 6.13630662E−04 | −2.02040065E−02 |
| A5 | −6.87983406E−04 | 2.34216287E−02 |
| A6 | 7.01982015E−05 | −1.66758562E−02 |
| A7 | 9.70393322E−06 | 8.39995040E−03 |
| A8 | −1.59016534E−06 | −3.02460050E−03 |
| A9 | 1.44785309E−08 | 7.82593934E−04 |
| A10 | 1.75375194E−08 | −1.48736890E−04 |
| A11 | −1.71111872E−09 | 2.08051966E−05 |
| A12 | −1.17316670E−10 | −2.05399365E−06 |
| A13 | 5.27972831E−12 | 1.48847046E−07 |
| A14 | −1.82635827E−12 | −6.56854664E−09 |
| A15 | 4.32080585E−13 | 5.56961180E−11 |
| A16 | 1.12386413E−13 | −1.13146905E−10 |
| A17 | 0.00000000E+00 | 0.00000000E+00 |
| A18 | 0.00000000E+00 | 0.00000000E+00 |

| SURFACE NUMBER | 17 | 18 |
|---|---|---|
| KA | 4.09177993E−01 | −1.33610231E+01 |
| A3 | −5.67176323E−03 | −1.17220410E−02 |
| A4 | 8.08616925E−03 | 1.28762295E−02 |
| A5 | −4.65084992E−03 | −2.16166099E−03 |
| A6 | 2.35698666E−03 | −1.50656379E−03 |
| A7 | −2.38156340E−03 | 7.48518482E−04 |
| A8 | 1.42823954E−03 | −2.15480139E−04 |
| A9 | −4.14113147E−04 | 6.24176095E−05 |
| A10 | 3.14291163E−05 | −1.13583105E−05 |
| A11 | 7.41161846E−06 | 1.72108112E−07 |
| A12 | 1.99157681E−06 | 2.43105207E−08 |
| A13 | −1.89706362E−06 | 8.97111371E−08 |
| A14 | 4.04449444E−07 | −2.54737911E−08 |
| A15 | −3.27328612E−08 | 2.67893276E−09 |
| A16 | 6.06547139E−10 | −1.80665828E−10 |

Table 13 shows values corresponding to Conditional Expressions (1) to (7) of the imaging optical systems of Examples 1 to 4. Meanwhile, the d line is used as a reference wavelength in all the examples, and values shown in the following Table 13 are equivalent to those at this reference wavelength.

TABLE 13

| EXPRESSION NUMBER | CONDITIONAL EXPRESSION | EXAMPLE 1 | EXAMPLE 2 | EXAMPLE 3 | EXAMPLE 4 |
|---|---|---|---|---|---|
| (1) | H*\|f\|/(L*I) | 0.065 | 0.065 | 0.075 | 0.052 |
| (2) | I/dl | 0.456 | 0.494 | 0.467 | 0.402 |
| (3) | b/a | 5.61 | 5.62 | 5.72 | 6.01 |
| (4) | H*f²/(fo*I²) | 1.090 | 0.998 | 1.144 | 0.851 |
| (5) | fo/\|f\| | 1.29 | 1.41 | 1.41 | 1.62 |
| (6) | enp/I | 1.39 | 1.40 | 1.61 | 1.38 |
| (7) | (Rpr + Rmf)/(Rpr − Rmf) | 0.33 | 0.41 | 0.50 | 0.38 |

From the above-mentioned data, it can be understood that the imaging optical systems of Examples 1 to 4 all satisfy Conditional Expressions (1) to (7), and are imaging optical systems which are configured such that the total angle of view is equal to or greater than 100° to have a wide angle of view, while various aberrations are appropriately corrected and a lens diameter is kept small.

Figure 9:
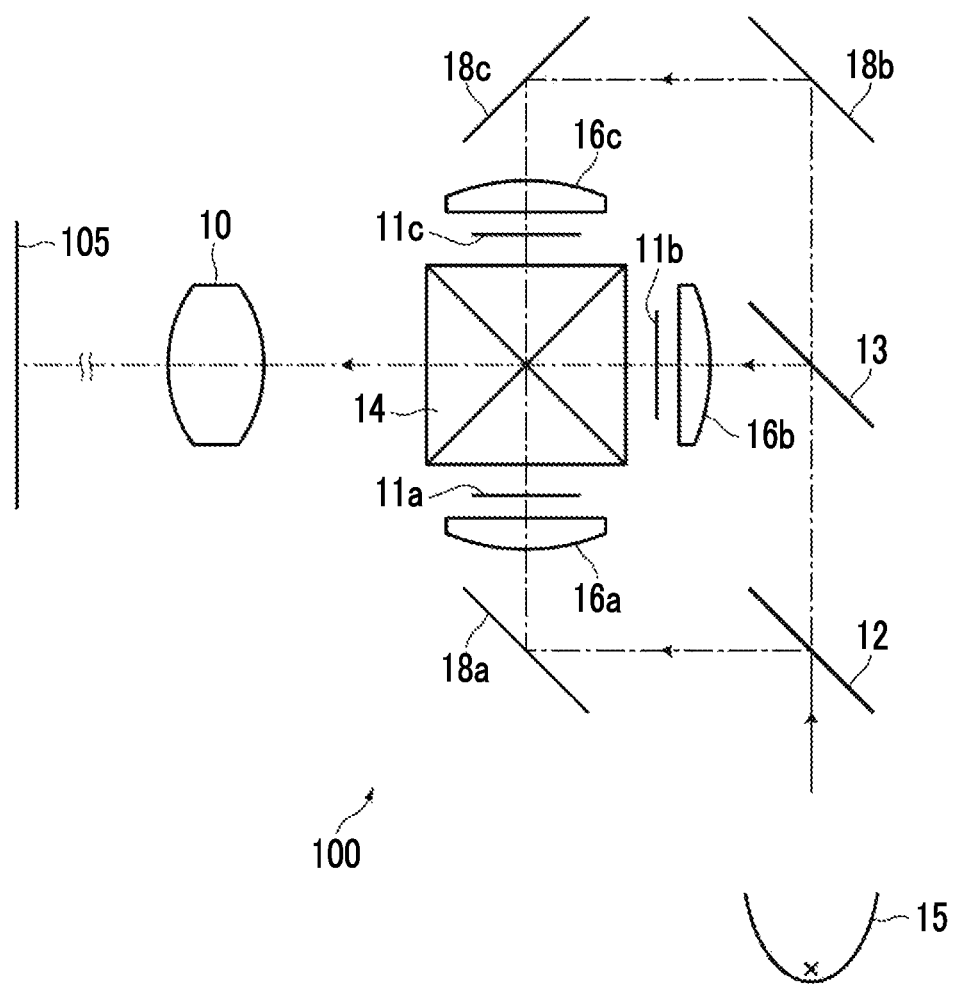
FIG. 9 is a schematic configuration diagram of a projection-type display apparatus according to an embodiment of the present invention.

Next, a projection-type display apparatus according to an embodiment of the present invention will be described. FIG. 9 is a schematic configuration diagram of a projection-type display apparatus according to the embodiment of the present invention. A projection-type display apparatus 100 shown in FIG. 9 includes an imaging optical system 10 according to an embodiment of the present invention, a light source 15, transmission-type display devices 11a to 11c as light valves corresponding to respective beams of colored light, dichroic mirrors 12 and 13 for color decomposition, a cross dichroic prism 14 for color synthesis, capacitor lenses 16a to 16c, and total reflection mirrors 18a to 18c for deflecting an optical path. Meanwhile, in FIG. 9, the imaging optical system 10 is schematically shown. In addition, an integrator is disposed between the light source 15 and the dichroic mirror 12, but is not shown in FIG. 9.

White light from the light source 15 is decomposed into three colored light fluxes (G light, B light, and R light) by the dichroic mirrors 12 and 13. The decomposed light fluxes are then incident on the transmission-type display devices 11a to 11c corresponding to the respective colored light fluxes through the capacitor lenses 16a to 16c, respectively, and are optically modulated. The modulated light fluxes are color-synthesized by the cross dichroic prism 14, and then are incident on the imaging optical system 10. The imaging optical system 10 projects an optical image of light optically modulated by the transmission-type display devices 11a to 11c onto a screen 105.

Figure 10:
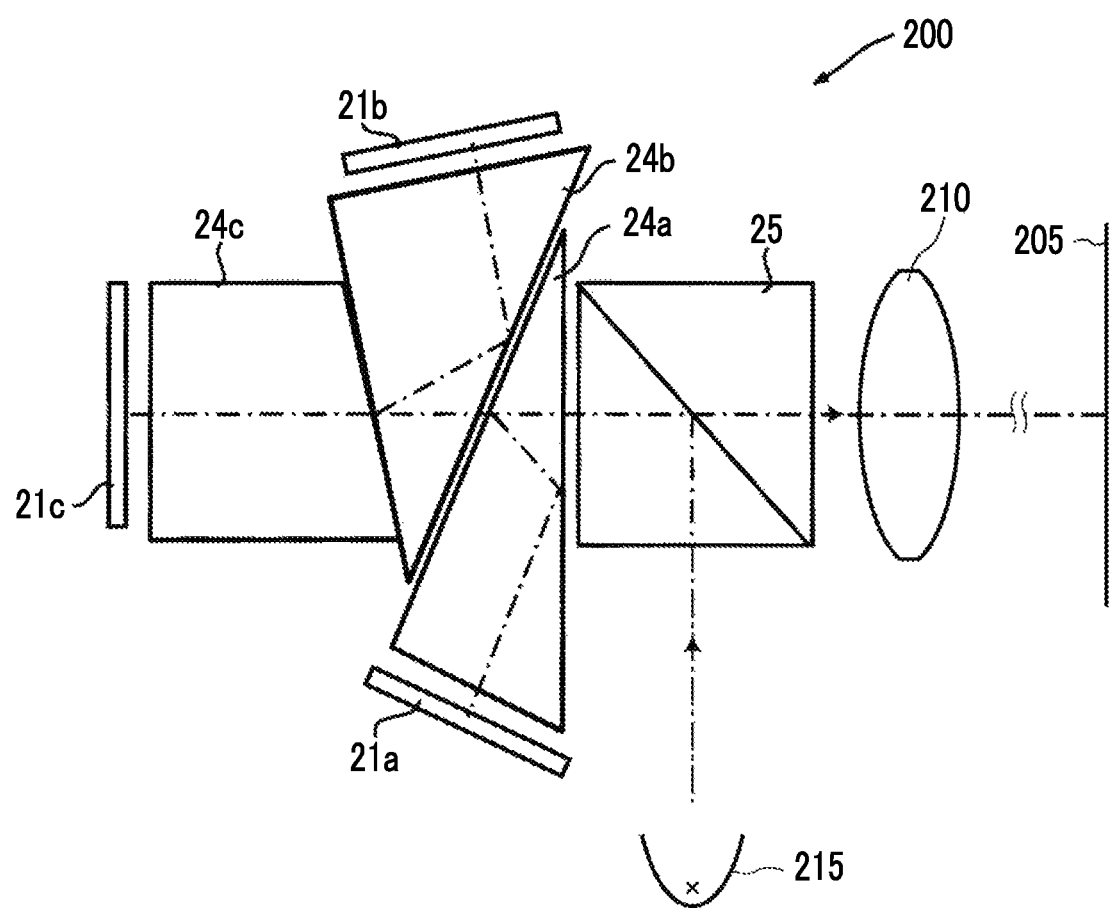
FIG. 10 is a schematic configuration diagram of a projection-type display apparatus according to another embodiment of the present invention.

FIG. 10 is a schematic configuration diagram of a projection-type display apparatus according to another embodiment of the present invention. A projection-type display apparatus 200 shown in FIG. 10 includes an imaging optical system 210 according to the embodiment of the present invention, a light source 215, DMDs 21a to 21c as light valves corresponding to respective beams of colored light, total internal reflection (TIR) prisms 24a to 24c for color decomposition and color synthesis, and a polarization separation prism 25 that separates illumination light and projected light. Meanwhile, in FIG. 10, the imaging optical system 210 is schematically shown. In addition, an integrator is disposed between the light source 215 and the polarization separation prism 25, but is not shown in FIG. 10.

White light from the light source 215 is reflected from a reflecting surface inside the polarization separation prism 25, and then is decomposed into three colored light fluxes (G light, B light, and R light) by the TIR prisms 24a to 24c. The respective colored light fluxes after the decomposition are incident on the DMDs 21a to 21c corresponding thereto and are optically modulated. The modulated light fluxes travel through the TIR prisms 24a to 24c again in an opposite direction and are color-synthesized. The synthesized light passes through the polarization separation prism 25 and is incident on the imaging optical system 210. The imaging optical system 210 projects an optical image of light optically modulated by the DMDs 21a to 21c onto a screen 205.

Figure 11:
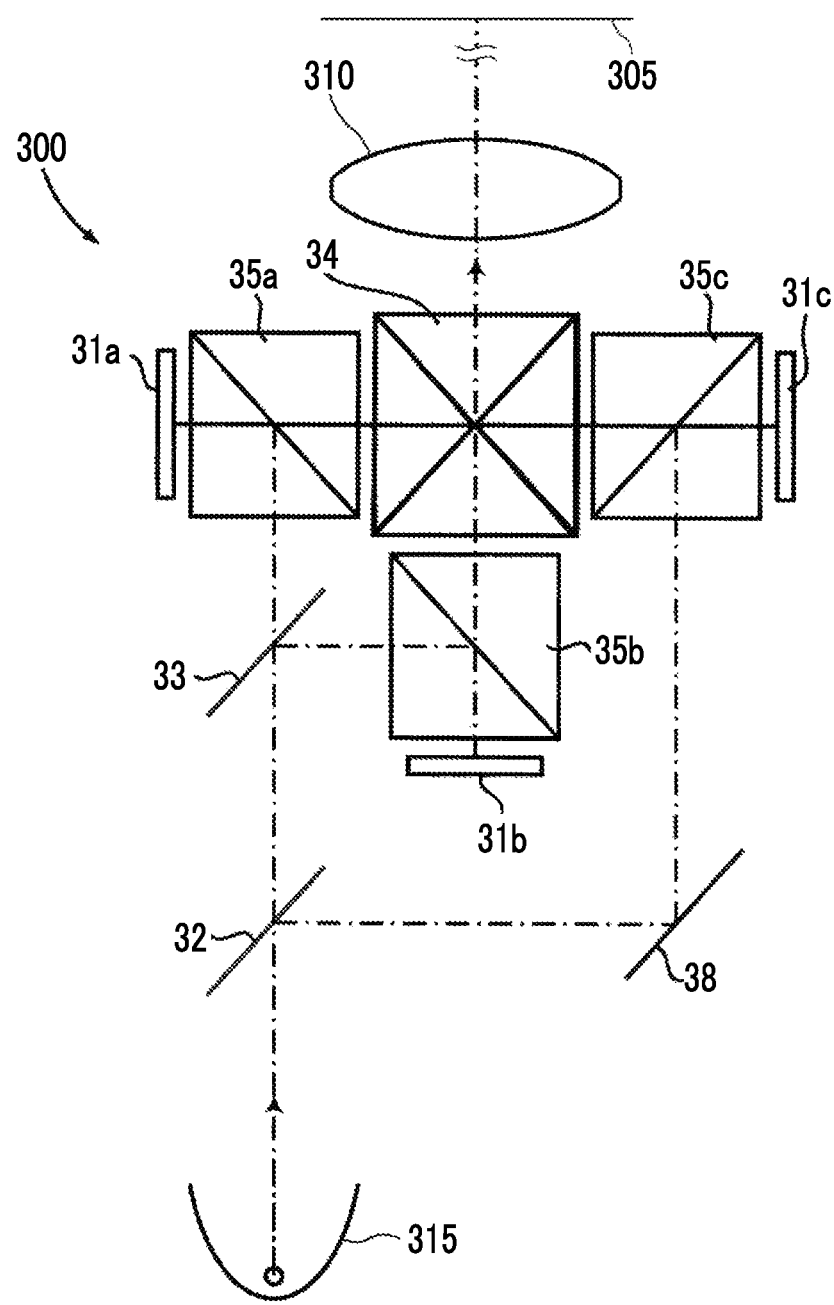
FIG. 11 is a schematic configuration diagram of a projection-type display apparatus according to still another embodiment of the present invention.

FIG. 11 is a schematic configuration diagram of a projection-type display apparatus according to still another embodiment of the present invention. A projection-type display apparatus 300 shown in FIG. 11 includes an imaging optical system 310 according to the embodiment of the present invention, a light source 315, reflection-type display devices 31a to 31c as light valves corresponding to respective beams of colored light, dichroic mirrors 32 and 33 for color separation, a cross dichroic prism 34 for color synthesis, a total reflection mirror 38 for optical path deflection, and polarization separation prisms 35a to 35c. Meanwhile, in FIG. 11, the imaging optical system 310 is schematically shown. In addition, an integrator is disposed between the light source 315 and the dichroic mirror 32, but is not shown in FIG. 11.

White light from light source 315 is decomposed into three colored light fluxes (G light, B light, and R light) by the dichroic mirrors 32 and 33. The respective colored light fluxes after the decomposition are incident on the reflection-type display devices 31a to 31c corresponding to the respective colored light fluxes through the polarization separation prisms 35a to 35c, respectively, and are optically modulated. The modulated light fluxes are color-synthesized by the cross dichroic prism 34, and then are incident on the imaging optical system 310. The imaging optical system 310 projects an optical image of light optically modulated by the reflection-type display devices 31a to 31c onto a screen 305.

Figure 12:
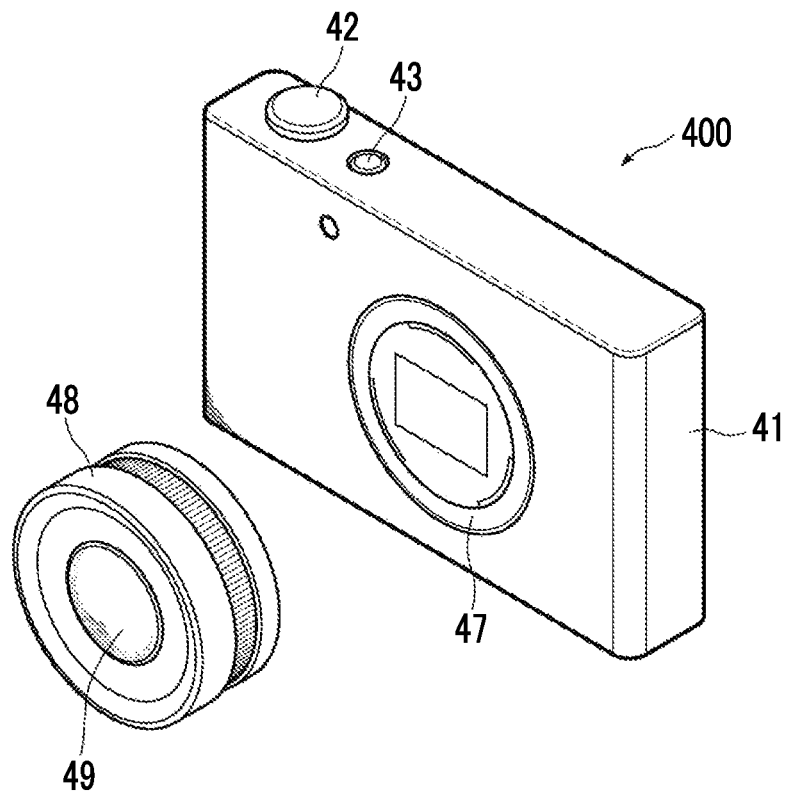
FIG. 12 is a perspective view of a front side of an imaging apparatus according to an embodiment of the present invention.
Figure 13:
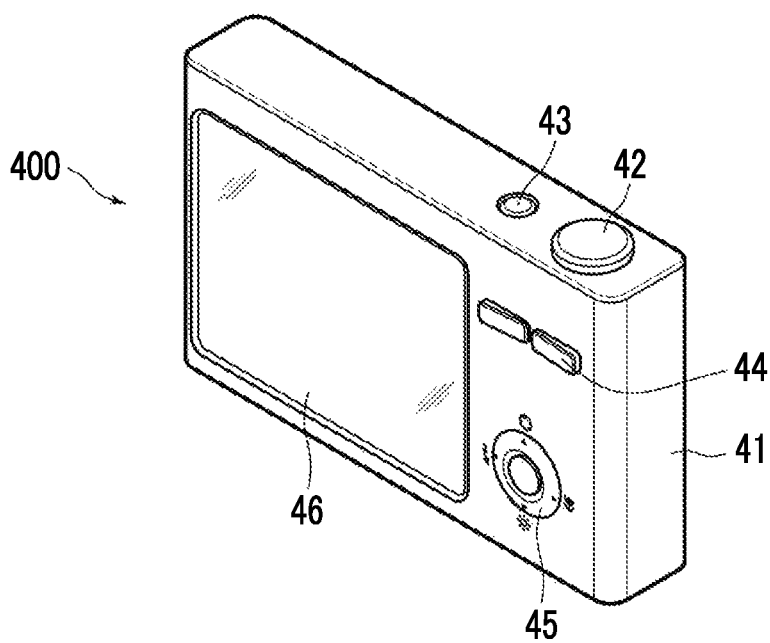
FIG. 13 is a perspective view of a rear surface side of the imaging apparatus shown in FIG. 12.

FIGS. 12 and 13 are appearance diagrams of a camera 400 which is an imaging apparatus of an embodiment of the present invention. FIG. 12 shows a perspective view when the camera 400 is seen from the front side, and FIG. 13 is a perspective view when the camera 400 seen from the rear surface side. The camera 400 is a single-lens digital camera, having no reflex finder, which has an interchangeable lens 48 detachably mounted therein. The interchangeable lens 48 has an imaging optical system 49 which is an optical system according to the embodiment of the present invention housed within a lens barrel.

This camera 400 includes a camera body 41, and is provided with a shutter button 42 and a power button 43 on the upper surface of the camera body 41. In addition, operating portions 44 and 45 and a display portion 46 are provided on the rear surface of the camera body 41. The display portion 46 is used for displaying a captured image or an image within an angle of view before image capture.

An imaging aperture on which light from an imaging target is incident is provided on the front central portion of the camera body 41, a mount 47 is provided at a position corresponding to the imaging aperture, and the interchangeable lens 48 is mounted onto the camera body 41 through the mount 47.

The camera body 41 is provided therein with an imaging device (not shown) such as a charge coupled device (CCD) that outputs an imaging signal according to a subject image formed by the interchangeable lens 48, a signal processing circuit that processes the imaging signal which is output from the imaging device to generate an image, a recording medium for recording the generated image, and the like. In this camera 400, a still image or a moving image can be captured by pressing the shutter button 42, and image data obtained by this image capture is recorded in the recording medium.

Hereinbefore, the present invention has been described through embodiments and examples, but the imaging optical systems of the present invention are not limited to those of the above examples, and can be variously modified. For example, it is possible to appropriately change the radius of curvature, the surface spacing, the refractive index, and the Abbe number of each lens.

In addition, the projection-type display apparatuses of the present invention are also not limited to the above configurations. For example, the light valves which are used and the optical members which are used for light flux separation or light flux synthesis are not limited to the above configurations, and can be modified in various forms.

In addition, the imaging apparatus of the present invention is also not limited to the above configuration, and can also be applied to, for example, a single-lens reflex camera, a film camera, a video camera, and the like.

EXPLANATION OF REFERENCES 10, 210, 310: imaging optical system
11a to 11c: transmission-type display device
12, 13, 32, 33: dichroic mirror
14, 34: cross dichroic prism
15, 215, 315: light source
16a to 16c: capacitor lens
18a to 18c, 38: total reflection mirror
21a to 21c: DMD
24a to 24c: TIR prism
25, 35a to 35c: polarization separation prism
31a to 31c: reflection-type display device
41: camera body
42: shutter button
43: power button
44, 45: operating portion
46: display portion
47: mount
48: interchangeable lens
49: imaging optical system
100, 200, 300: projection-type display apparatus
105, 205, 305: screen
400: camera
G1: first optical system
G2: second optical system
L1a to L2j: lens
PP: optical member
Sim: image display surface
St: aperture diaphragm
wa: on-axis light flux
wb: light flux of maximum angle of view
Z: optical axis

What is claimed is:

1. An imaging optical system capable of projecting an image, displayed on an image display device disposed on a reduced-side conjugate plane, as a magnified image on a magnified-side conjugate plane, the system comprising, in order from a magnified side:
    a first optical system which is constituted by a plurality of lenses; and
    a second optical system which is constituted by a plurality of lenses, wherein
    the second optical system forms the image displayed on the image display device as an intermediate image,
    the first optical system forms the intermediate image on the magnified-side conjugate plane,
    a height of a principal ray of light having a maximum angle of view becomes maximum on a lens surface of the whole system on the most magnified side, among heights of principal rays of light having a maximum angle of view on respective lens surfaces, and the following Conditional Expressions (1) and (4) are satisfied, $$0.03 < H \times |f|/(L \times I) < 0.09 \quad (1)$$

$$0.8 < H \times f^2/(fo \times I^2) < 1.3 \quad (4)$$

where H is a height of the principal ray of light having a maximum angle of view on a plane orthogonal to an optical axis through a point of intersection between the lens surface on the most magnified side and the optical axis, f is a focal length of the whole system, L is a distance on the optical axis between the lens surface on the most magnified side and a lens surface on a most reduced side, I is a maximum image height on a reduced side, and fo is a focal length of the first optical system.

2. The imaging optical system according to claim 1, wherein the following Conditional Expression (6) is satisfied, $$1 < enp/I < 2 \quad (6)$$

where enp is a distance on the optical axis from the lens surface on the most magnified side to a pupil position on the magnified side.

3. The imaging optical system according to claim 2, wherein the following Conditional Expression (1-1) is satisfied, $$0.04 < H \times |f|/(L \times I) < 0.08 \quad (1\text{-}1).$$

4. The imaging optical system according to claim 2, wherein the following Conditional Expression (4-1) is satisfied, $$0.84 < H \times f^2/(fo \times I^2) < 1.2 \quad (4\text{-}1).$$

5. The imaging optical system according to claim 2, wherein a total angle of view is equal to or greater than 100°.

6. The imaging optical system according to claim 1, wherein the following Conditional Expression (1-1) is satisfied, $$0.04 < H \times |f|/(L \times I) < 0.08 \quad (1\text{-}1).$$

7. The imaging optical system according to claim 6, wherein the following Conditional Expression (4-1) is satisfied, $$0.84 < H \times f^2/(fo \times I^2) < 1.2 \quad (4\text{-}1).$$

8. The imaging optical system according to claim 6, wherein a total angle of view is equal to or greater than 100°.

9. The imaging optical system according to claim 1, wherein the following Conditional Expression (4-1) is satisfied, $$0.84 < H \times f^2/(fo \times I^2) < 1.2 \quad (4\text{-}1).$$

10. The imaging optical system according to claim 9, wherein a total angle of view is equal to or greater than 100°.

11. The imaging optical system according to claim 1, wherein a total angle of view is equal to or greater than 100°.

12. The imaging optical system according to claim 1, wherein an optical element on the most magnified side of the first optical system is a lens.

13. A projection-type display apparatus comprising:
a light source;
a light valve on which light from the light source is incident; and
the imaging optical system according to claim 1 as an imaging optical system that projects an optical image of light optically modulated by the light valve onto a screen.

14. An imaging apparatus comprising the imaging optical system according to claim 1.

* * * * *